(12) United States Patent
Cross et al.

(10) Patent No.: US 7,369,122 B2
(45) Date of Patent: May 6, 2008

(54) TOUCH PANEL SPACER DOTS AND METHODS OF MAKING

(75) Inventors: Elisa M. Cross, Woodbury, MN (US); Robert S. Moshrefzadeh, Oakdale, MN (US); Jessica L. Voss-Kehl, Shoreview, MN (US); Brant U. Kolb, Afton, MN (US); Emily S. Goenner, Roseville, MN (US); Brian E. Aufderheide, Cedarburg, WI (US); Michael J. Robrecht, Shorewood, WI (US); Bruce A. Nerad, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1215 days.

(21) Appl. No.: 10/017,268

(22) Filed: Dec. 14, 2001

(65) Prior Publication Data

US 2003/0117476 A1   Jun. 26, 2003

(51) Int. Cl.
*G06F 3/041* (2006.01)
*G06F 3/045* (2006.01)
*H01L 29/04* (2006.01)

(52) U.S. Cl. ............... 345/173; 178/18.05; 257/59
(58) Field of Classification Search ........ 345/156–184; 349/155; 178/18; 257/59; 438/99, 347; 427/58–126.6, 466–486
See application file for complete search history.

(56) References Cited

U.S. PATENT DOCUMENTS

| | | | | |
|---|---|---|---|---|
| 4,864,084 A | * | 9/1989 | Cardinale | 200/5 A |
| 5,021,802 A | | 6/1991 | Allred | 347/99 |
| 5,541,370 A | * | 7/1996 | Matsuda et al. | 178/18.05 |
| 5,648,407 A | | 7/1997 | Goetz et al. | |
| 5,668,353 A | | 9/1997 | Matsuda et al. | |
| 5,707,684 A | | 1/1998 | Hayes et al. | |
| 6,087,008 A | | 7/2000 | Yoshida | |
| 6,114,645 A | * | 9/2000 | Burgess | 200/512 |
| 6,218,679 B1 | * | 4/2001 | Takahara et al. | 257/59 |
| 6,245,469 B1 | | 6/2001 | Shiba et al. | |
| 6,361,161 B1 | | 3/2002 | Anstadt et al. | |
| 6,380,497 B1 | * | 4/2002 | Hashimoto et al. | 200/5 A |
| 6,395,863 B2 | * | 5/2002 | Geaghan | 528/196 |
| 6,529,188 B1 | * | 3/2003 | Suzuki | 345/173 |
| 6,627,918 B2 | | 9/2003 | Getz et al. | |
| 6,883,908 B2 | * | 4/2005 | Young et al. | 347/102 |

FOREIGN PATENT DOCUMENTS

| | | |
|---|---|---|
| EP | 0 301 842 | 2/1989 |
| EP | 0 625 789 | 11/1994 |
| EP | 0860294 A2 | 8/1998 |
| EP | 0860294 A3 | 8/1998 |
| EP | 1046946 | 10/2000 |
| JP | SHO 52-154409 | 12/1977 |

OTHER PUBLICATIONS

Donald J. Hayes, et al., "Low-cost display assembly and interconnect using ink-jet printing technology", Journal of the SID, Sep. 1, 2001, pp. 9-12.
R. Danzebrink et al., "Deposition of optical microlens arrays by ink-jet process", Thin Solid Films, 327-329 (1-2) (1998) pp. 503-505.
U.S. Appl. No. 09/756,312, "Methods and Compositions for Ink Jet Printing of Pressure Sensitive Adhesive Patterns or Films on a Wide Range of Substrates", filed Jan. 8, 2001, James K. Young et al.
U.S. Appl. No. 09/756,303, "Energy Curable Inks and Other Compositions Incorporating Surface Modified, Nanometer-Sized Particles", filed Jan. 8, 2001, Dong Wu, et al.

* cited by examiner

*Primary Examiner*—Sumati Lefkowitz
*Assistant Examiner*—Srilakshmi K Kumar (57) ABSTRACT

The present invention provides touch panels and touch panel substrates that include spacer dots comprising a nanocomposite material. The present invention also provides methods of ink jet printing spacer dots for touch panel applications. The spacer dots and methods of making spacer dots can lead to spacers that have good durability, have controllable sizes, shapes, and spacings, and have desirable optical properties.

23 Claims, 1 Drawing Sheet

TOUCH PANEL SPACER DOTS AND METHODS OF MAKING

The present invention relates generally to touch panels that include spacer dots and to methods of printing spacer dots for touch panels.

BACKGROUND

Resistive touch screens include a rigid substrate, a flexible substrate, and spacer dots. The spacer dots are disposed between the substrates to prevent undesired contact between the conductive coatings supplied on each of the substrates. The flexible substrate provides the touch surface. When a user applies a sufficient force on the touch surface of the flexible substrate, contact can be made between the conductive coatings, and the position of the touch can be determined. Spacer dots have been made using a number of techniques, including screen printing and photolithography.

SUMMARY OF THE INVENTION

Touch panel spacer dots experience repetitive forces over the lifetime of the touch panel. If the spacer dots fail, the functionality of the touch panel can fail. Indeed, many of the failure modes of touch panels can be attributed, at least in part, to the spacer dots. Further, if the spacer dots are not formed as intended (e.g., missing spacer dots, inconsistently sized or spaced dots, etc.), the response of the touch panel may be non-uniform across the panel. Still further, spacer dots that are visible by a user can detract from the visual appearance of a display in applications where the display is viewed directly through the touch panel. As such, there is a need for touch panel spacer dots that can be reliably and controllably formed, that exhibit desired durability and physical integrity, and that have desirable optical properties.

The present invention provides a method for making a touch activated user input device that includes providing a first substrate comprising a first conductive coating, ink jet printing a plurality of dots on the first conductive coating, hardening the dots to form spacers adhered to the first substrate, and placing a second substrate comprising a second conductive coating over the first substrate such that the spacers maintain a distance between the first and second substrates to prevent detection of a touch location when no external force is applied and allow detection of a localized touch location when a sufficient localized external force is applied between the first and second substrates.

In another aspect, the present invention provides a method for forming dots suitable as spacers in touch panels, including providing curable gel composition, heating the gel composition to form a liquid composition, ink jetting the liquid composition onto a transparent conductive coating to form a plurality of dots, cooling the dots into a gel state, and curing the dots to adhere the dots to the transparent conductive coating. The cured dots have heights of about 2 microns or more, and have height to diameter aspect ratios of about 1:10 or more.

In yet another aspect, the present invention provides a method for making touch panel spacer dots that includes printing a nanocomposite composition comprising surface-modified inorganic nanoparticles dispersed in an energy curable fluid vehicle to form a plurality of curable dots on a conductive coating, and curing the curable dots to adhere the dots to the conductive coating.

In another aspect, the present invention provides a method of making touch panel spacer dots that includes selecting a transparent conductive coating suitable for use in a touch panel and formulating a curable gel composition capable of (i) being ink jet printed onto the transparent conductive coating to form a droplet on the transparent conductive coating that has a height to diameter aspect ratio of about 1:10 or more for droplets having height of about 2 to 10 microns or more, and (ii) adhering to the transparent conductive coating upon curing, without modifications to the transparent conductive coating.

In still another aspect, the present invention provides a touch panel that includes a first substrate comprising a first conductive coating, a second substrate comprising a second conductive coating, and a plurality of spacer dots disposed between the first and second substrates to maintain a distance between the first and second substrates to prevent detection of a touch location when no external force is applied and allow detection of a localized touch location when a sufficient localized external force is applied between the first and second substrates, the plurality of spacers dots comprise a nanocomposite material comprising about 5% or more by weight of surface-modified inorganic nanoparticles.

In another aspect, the present invention provides a method for making touch panel spacer dots that includes the steps of providing a touch panel substrate comprising a plurality of spacer dots, inspecting the substrate for missing or damaged spacer dots, and ink jet printing material to fill in or repair a missing or damaged spacer dot identified in the inspecting step.

In still another aspect, the present invention provides a display system the incorporates a touch panel, including a first substrate, a second substrate disposed over the first substrate, and a plurality of spacer dots disposed between the first and second substrates, wherein said spacer dots are formed by ink jet printing.

In yet another aspect, the present invention provides a display system that incorporates a touch panel, including a first substrate, a second substrate disposed over the first substrate, and a plurality of spacer dots comprising a nanocomposite material including about 5% or more by weight of surface-modified inorganic nanoparticles.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention relates generally to structures suitable for use as spacer dots for touch panel user interface devices and to methods for making such structures. In particular, the present invention relates to touch panels, and substrate elements for touch panels, that include spacers dots made by ink jet printing, as well as printed nanocomposite spacer dots. The present invention also relates to ink jet printing methods for forming structures suitable for use as spacer dots in touch panels.

Figure 1:
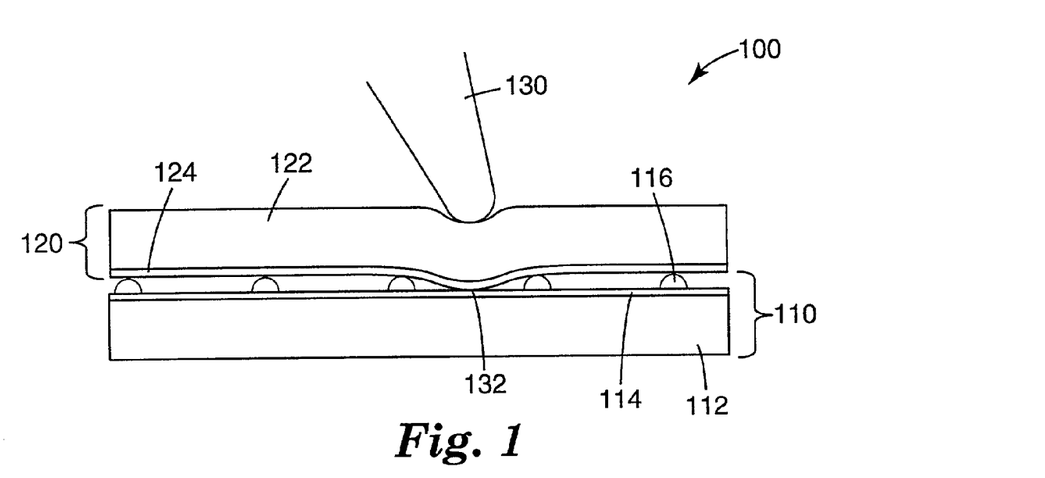
FIG. 1 is a partial schematic side view of a touch panel that includes spacer dots.

FIG. 1 shows a partial view of a resistive touch screen 100. It includes a bottom element 110 and a top element 120. Bottom element 110 includes a bottom substrate 112, a conductive layer 114, and plurality of spacer dots 116. Top element 120 includes a top substrate 122 and a conductive layer 124. As shown, at least top element 120 is flexible so that when an object such as stylus 130 (or a finger or other suitable object, not shown), is pressed onto a spot on the touch panel 100, the top element 120 can locally deform. In cases where the applied local force from the stylus or other object is sufficient, contact can be made between bottom conductive layer 114 and top conductive layer 124, for example at contact location 132. The location of electrical contact between the two conductive layers due to such an external "touch" can be determined, thereby providing user input data. In exemplary cases, touch panel 100 can be suitably positioned over an electronic display or graphics (not shown) so that a user can view the display or graphics through the touch panel and also use the touch panel as an input device. In other cases, the touch panel may be opaque and used as an input device such as a mouse pad, electronic signature pad, or the like.

As shown, bottom element 110 includes a substrate 112, a conductive coating 114, and spacers 116. It is also contemplated that top element 120 can additionally or alternatively include the spacer dots. For simplicity, and without loss of generality, spacer dots are shown as part of the bottom element in the drawings. Substrate 112 can be any suitable material, and in cases where touch panel 100 is placed over a display or other object to be viewed through the touch panel, substrate 112 is generally transparent to visible light. Exemplary substrates 112 include glass and rigid plastics such as polyacrylates, polycarbonates, and the like, although flexible materials can also be used. Conductive coating 114 can be any suitable conductive coating, and can also be a transparent conductive coating when a see-through touch panel is desired. Exemplary transparent conductive coatings include transparent conductive oxides such as indium tin oxide (ITO). Conductive coatings can also include conductive organic coatings, for example conductive polymers.

Spacer dots 116 are disposed on, and preferably adhered to, conductive coating 114. The spacer dots function to maintain a gap between the bottom conductive coating 114 and top conductive coating 124 when no external localized force is applied, and to allow localized contact of the bottom and top conductive coatings when a sufficient localized external force is applied. The size, shape, and spacing of the dots can be varied to control the force required to make electrical contact between the conductive coatings (the actuation force, or "touch-down" force, of the touch screen). The size, shape, and spacing of the dots can also affect the optical properties of the touch screen, especially in situations where a display is meant to be seen through the touch panel. For example, when the spacer dots have a property such that light transmitted through them tends to be scattered, the spacer dots may become visible to a user, even though their sizes may be a few tens of micrometers in diameter. Furthermore, materials and mechanical properties of the dots can have an impact on the functionality of the touch panel. For example, the cohesive strength between the dots and the coating to which they are bonded can impact touch panel functionality (e.g., spacer dots preferably remain adhered to the conductive coating throughout the useful lifetime of the touch panel). The spacer dots should also be robust enough to substantially maintain their shape and adherence, and to resist breakage, over the useful lifetime of the touch panel.

Figure 2:
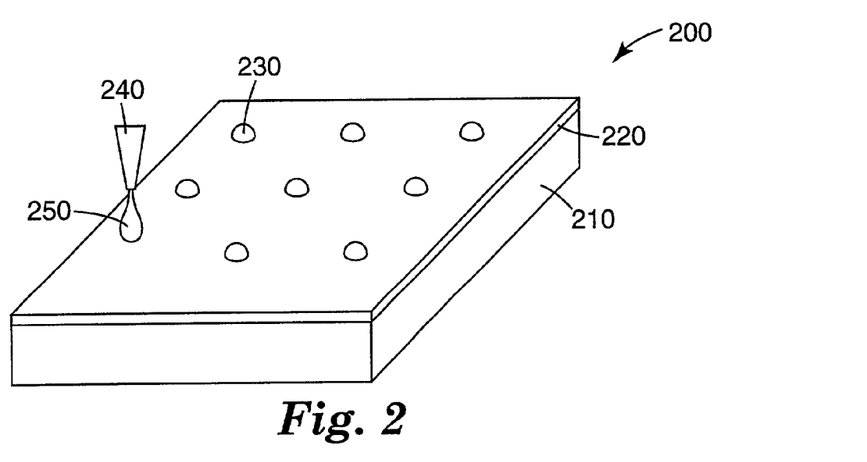
FIG. 2 is a partial schematic plan view of a spacer dots being ink jet printed onto a touch panel substrate element.

According to the present invention, spacer dots can be formed by ink jet printing droplets of material onto touch panel substrates, for example onto those that include transparent conductive coatings or other conductive coatings. FIG. 2 shows a schematic view of an article 200 that includes a substrate 210, a transparent conductive coating 220 disposed on the substrate, and droplets 230 being formed on the conductive coating by ink jet printing a spacer dot material 250 from an ink jet nozzle 240. The ink jet printed droplets can be hardened after printing, for example by curing via radiation exposure, heat exposure, and the like. In many cases, it may be desirable to set the position and shape of the ink jet printed droplets by cooling the droplets from a less viscous state for printing to a more viscous state that maintains a size and shape that is suitable for a touch panel spacer dot. In cases where the printed material is heated for ink jet printing, cooling may occur immediately upon contact with the surface. The material can then be cured (or otherwise hardened), if appropriate.

Ink jet printing of spacer dots can provide many advantages over conventional methods of forming touch panel spacer dots. Ink jet printing is a non-contact printing method, thus allowing spacer dots to be printed directly onto ITO and other conductive coatings without damaging and/or contaminating the surface due to contact as may occur when using screens or masks and/or wet processing during conventional spacer dot printing. Ink jet provides a highly controllable printing method that can produce consistently shaped, sized, and spaced dots. Controllable dot shapes, spacings, and dimensions are desirable so that desirable physical properties of the touch panel can be selected, for example having a uniform touch actuation force across the touch surface of the device.

Ink jetting can also provide a higher degree of confidence that all the dots have been printed, and if it is determined that a dot has been missed, can provide the ability to go back and print skipped dots in the appropriate locations. In contrast, screen printing screens can get clogged, resulting in printed dot patterns where one or more of the dots are not printed. Screen printing, photolithography, and other conventional printing methods do not provide the ability to go back and print one or more particular dots that have been skipped. In these cases, ink jet printing could be used to "repair" the touch panel substrate by printing spacer dots in locations where the screen printing step has failed to produce a dot. Ink jet printing is highly versatile in that dot sizes, spacings, and patterns can be easily changed, whereas screen printing and other mask-based techniques require a different screen or mask to be used with each individual pattern. Thus, ink jetting does not require a large inventory of screens or masks that need to be cleaned and maintained. Ink jet printing can also be used to create differently sized dots on the same substrate element. This can be done in one printing step by controlling the amount of material jetted at each dot site, or can be done using multiple passes and/or multiple nozzles. For example, additional material can be jetted onto previously formed dots to create larger (e.g., taller) spacer dots. Ink jet printing can also result in smaller dot sizes than is practical from screen printing due to ink jet printing's much higher degree of controllability. For example, depending on the droplet volume and the amount of spreading of the printed droplet, ink jet printing can produce dot diameters smaller that 1 micron with reproducibility.

Figure 3:
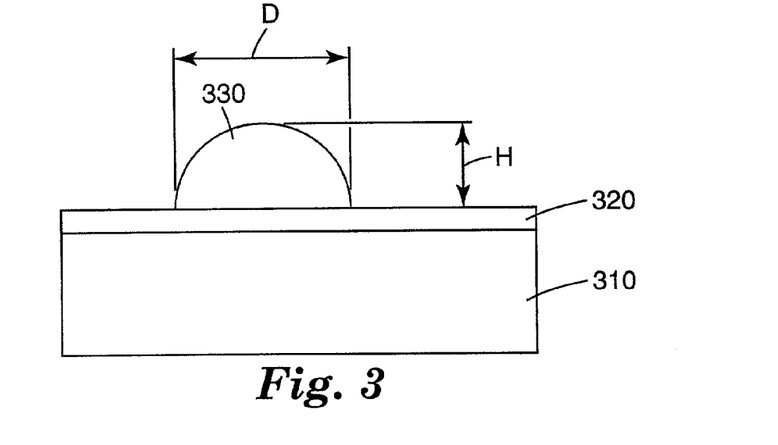
FIG. 3 is a schematic side view of a single spacer dot on a touch panel substrate element.

As indicated in FIG. 3, an exemplary spacer dot 330 according to the present invention can be characterized as having a height H and a diameter D. The height H of spacer dot 330 should put enough distance between the top of the spacer dot and the conductive coating 320 so that inadvertent electrical contact between conductive coating 320 and the conductive coating on the top element (not shown) can be avoided, at least when no touch is applied to the touch screen. In particular, H should be at least somewhat greater than the size of possible asperities or other defects in the conductive coating(s) that could potentially bridge the gap if the spacer dots were not tall enough. In illustrative cases, spacer dot heights may be in the range of about 2 to 10 micrometers, although shorter or taller spacer dots might be desired in some applications. In general, larger H means a lower probability of inadvertent electrical contact and a higher actuation force.

A desired diameter D for spacer dot 330 generally depends on the height H, so that the ratio H:D is often the relevant quantity, although the absolute value of D may also be important. Dots having a smaller D may be less visible to a user. Dots having a smaller D may also lead to better electronic performance of the touch panel due to less total areal coverage of the spacer dots. Very large dots may decrease touch screen resolution and/or increase the activation force. Smaller D spacer dots may be less robust, however, due to less contact area with the conductive coating and thus possibly lower adhesion. To be effective, spacer dots preferably remain adhered to the substrate element over a desired useful life of the touch panel, which is typically the useful life of the display or of the electronic device that the touch panel is integrated with. In illustrative cases, spacer dot diameters may be in the range of 20 to 200 micrometers, although smaller or larger spacer dots might be desired in some applications. Exemplary spacer dots have H:D ratios of about 1:10 or more (equivalently, 0.1 or more), more preferably about 1:5 or more (equivalently, 0.2 or more). In cases where the spacer dot heights are smaller than desired, ink jetting can be used to increase the heights of at least some of the spacer dots by printing additional material on top of them.

The present invention provides a method of ink jet printing materials onto a touch panel substrate element that includes a conductive coating so that the ink jet printed materials can be hardened to form spacer dots suitable for use in touch panels. Various factors may affect whether and to what degree the ink jet printed materials may be suited for forming spacer dots for touch panel applications. As discussed above, the optical properties of the ink jetted material, when hardened, can be important. For example, if the materials scatter visible light, the spacer dots may be conspicuous to a user and may detract from viewing quality when the touch panel is used with a display. Further, it may be desirable to print droplets that exhibit relatively little spreading after printing so that they can be hardened to form dots that have desirable H:D aspect ratios. Because the surface that the materials are printed onto is a conductive coating or other coating whose presence is important to the electronic functionality of the touch panel, it may not be desirable, or even possible, to alter the properties of the conductive coating in order to cause the printed droplets to "bead up" to achieve high H:D aspect ratios. In other words, to achieve a desired shape for the printed droplets, the material being ink jet printed is preferably formulated so that it resists spreading out after printing for at least as long at it takes to sufficiently harden the materials. It is also generally desirable for the ink jet printed material to adhere well enough to the substrate element so that the resultant spacer dots have sufficient durability. More preferably, the spacer dots should be adhered well enough to survive appropriate durability tests. Durability tests include linear abrasion tests whereby a stylus having a known weight is run back and forth over the surface of a touch screen for a specified number of cycles to see whether any spacer dots move, break, or lose adhesion. Physical integrity of the spacer dots can also be important, especially for smaller dots, or dots with relatively large H:D ratios.

Exemplary ink jet printable materials suitable for use in forming spacer dots in the present invention include those materials that can be ink jet printed in droplets of controllable size and retained on the surface after printing in a controlled shape. For example, the droplets can be printed having sizes and shapes commensurate with the intended size and shape of the spacer dots. Alternatively, the droplets can have sizes that are smaller that the intended size of the spacer dots, and multiple droplets can be printed at each spacer dot site to build up a spacer dot having a desired size and shape.

Ink jet printable gel materials, such as reversible gels or other similar materials, can be used to make spacer dots according to the present invention. In particular, a suitable gel material can be heated to a point where the viscosity of the material is sufficiently lowered to allow the material to be ink jet printed in controllable droplets. Upon contact with the print surface, the printed droplets can cool to a point where their viscosity is high enough to discourage spreading. Often, cooling occurs with contact and no separate cooling step is required. Sufficient cooling can lock the position and shape of the droplets in place. The droplets can be printed and then cured at a later time, for example by a separate processing step. Alternatively, the droplets can be cured in-line as they are being printed. The gel may be a curable material that can be hardened by exposure to radiation, for example.

Exemplary materials for ink jet printing to make spacer dots on conductive coatings include nanocomposite materials such as nanocomposite gels, for example the nanocomposite materials disclosed in co-assigned U.S. patent application Ser. No. 09/756,303. Nanocomposite materials are compositions that include an energy curable fluid vehicle and nanometer-sized inorganic particles that are substantially non-aggregated. The nanocomposites can be fabricated by modifying the surfaces of nanometer-sized inorganic particles with surface treatments, and then incorporating the surface-modified particles into an energy curable fluid vehicle. Nanocomposite materials provide many advantages over conventional inks that are loaded with inorganic oxide particles with much larger particle size and/or with highly aggregated particles. Nanocomposite gels are nanocomposite materials whose nanoparticles reversibly agglomerate. For example, the nanocomposite gel particles may agglomerate at a certain temperature to form a gel and separate (or de-agglomerate) at elevated temperatures.

Nanocomposites can be particularly advantageous for ink jet printing spacer dots. The surface treatments and small size of the nanoparticles make the dispersions extremely stable. This can allow ink jet printing with reduced clogging the ink jet printheads, settling of the filler, etc., which often occur with larger filler particle size. In addition, nanocomposites can exhibit reversible nanoparticles agglomeration, allowing the material to be jetted at elevated temperatures and re-gelling upon printed, thereby resisting spreading. As such, nanocomposite-containing inks can give desirable dot gain. Dot gain characteristics depend upon factors including the nature of the ink composition, printing conditions, and the nature of the substrate. Nanocomposite materials are versatile, and the chemistry can be tailored to give favorable dot gain characteristics on a wide variety of substrates without requiring the substrate surface to be modified.

Regardless of the printing method, nanocomposite materials can provide improved spacer dots compared to dots made by industry standard methods such as screen printing inks that include conventional fumed silica fillers. Inks with conventional inorganic filler exhibit a significantly increased viscosity with only a small amount of inorganic filler, and therefore their inorganic content is limited. An example of a conventionally used and commercially available ink is one sold by Acheson Colloids Company under the trade name Electrodag PD-038 UV Curable Dielectric Coating. According to the present invention, nanocomposites suitable for printing to form touch panel spacer dots can be made that contain a much larger inorganic content and still have properties suitable for the applicable printing process to be used (e.g., low enough viscosity at elevated temperatures to allow for ink jet printing). The ability to have increased inorganic content can result in higher durability of the spacer dots due to the high physical integrity of the inorganic materials. Higher inorganic content is possible because of the small inorganic particle size in the nanocomposites useful in the present invention, as well as the ability to disperse the particles in the nanocomposites without substantial aggregation, for example without the kind of particle aggregation that characterizes fumed silica composites. This allows a higher inorganic content to be achieved, both by weight and by volume, and still allows the higher inorganic content materials to be suitably printed. The smaller particle size and absence of substantial aggregation can also contribute to higher optical clarity, resulting in spacer dots that are less noticeable to a user. As used herein, the term aggregation refers to particles being fused together whereas agglomeration refers to particles that are grouped but that can be separated, for example by heating the composition.

Preferably, printable nanocomposites for forming spacer dots according to the present invention include 5% by weight or more inorganic surface-modified nanoparticles, more preferably in a range of about 10% by weight to about 40% by weight of inorganic surface-modified nanoparticles. The increased inorganic content of nanocomposites can lead to improved mechanical and durability properties such as hardness, modulus, abrasion resistance, and refractive index. The nanometer-sized particles are generally much smaller than visible light wavelengths, and as such can be made so that they do not substantially interfere with optical clarity.

The printed nanocomposite dots of the present invention can be applied by any suitable printing method such as screen printing, ink jet printing, printing through a mask or stencil, intaglio printing, transfer printing, or the like. Exemplary nanocomposite materials for use with printing methods include nanocomposite gel materials capable of exhibiting shear thinning behavior during printing (preferred for screen printing) and/or capable of being jetted at temperatures where the viscosity of the material is in the Newtonian regime (preferred for ink jet printing).

Nanocomposites having a wide range of rheological behavior can be obtained by different combinations of particle surface treatments and fluid vehicles. Surface treatments that make the particles more compatible with the fluid vehicle tend to provide fluid, relatively low viscosity, substantially Newtonian compositions. Treatments that make the particles only marginally compatible with the fluid vehicle tend to provide compositions that exhibit one or more of thixotropy, shear thinning, and/or reversible gel formation, preferably in combination with low elasticity. Treatments that are more incompatible with the fluid vehicle generally provide formulations that tend to settle, phase separate, agglomerate or the like. Thus, it can be appreciated that the surface modification approach offers tremendous control and flexibility over rheological and mechanical characteristics.

For printing, particularly preferred compositions are in the form of thickened fluids or gels that exhibit desirable thinning behavior, having low elasticity and substantially no yield stress when in the fluid state. Gelling and/or thickening properties preferably result by selecting a surface modification that renders the particles only marginally compatible with the vehicle fluid so as to promote the desired thickening, thixotropic, shear-thinning, and/or gelling characteristics. Marginally compatible thickening agents tend to provide systems in which rheological behavior depends upon the amount of energy imparted to the system. For example, preferred composition embodiments may exist as a transparent, clear gel at room temperature and low (or no) shear. Upon imparting higher shear, heating to a higher temperature (e.g., about 60° C.), and/or imparting sonic or other suitable energy to the composition, the gel is transformed into a low viscosity fluid. Upon cooling and/or removing the sonic and/or shear energy, the gel reforms.

Preferably, a combination comprising relatively polar and nonpolar surface treatments is used to achieve surface modification of particles. The use of such a combination of surface treatment agents allows the compatibility between the surface modified particles and the fluid vehicle, in one preferred mode of practice, to be easily adjusted by varying the relative amounts of such agents. Of course, as another option in certain cases, a single surface modification component may also be used. Alternatively or in addition to this approach, the fluid vehicle also may comprise relatively polar and nonpolar constituents. This approach also allows the degree of compatibility with the particles to be adjusted by varying the relative amounts of such fluid constituents.

While not wishing to be bound by theory, it is believed that the compatibility between the fluid vehicle and the particle surfaces tends to favor particle-vehicle interactions over particle-particle interactions. When particle-binder precursor interactions are favored, the compositions tend to exist as a low viscosity Newtonian fluid. In contrast, when particle-particle interactions are more favored, the compositions tend to thicken more significantly as the volume percent of particles is increased.

Preferred treatment agents of the present invention suitable for forming compositions with a wide range of rheological properties may be represented schematically by the following formula:

$$(X)_r\text{—}W\text{-}(A)_s$$

wherein A is the attachably reactive moiety, s is at least 1 to 4, preferably 1; W is a relatively polar or relatively nonpolar moiety (as the case may be) having a valency of r+s, preferably having a skeleton comprising 2 to 30, more preferably 3 to 20 carbon atoms; X is a moiety comprising a free radically or cationically reactive group such as a (meth)acryl moiety; and r is 0 to 4, preferably 0 or 1. In embodiments in which the composition is to function as an ink or the like, r is desirably 1. The attachably reactive moiety A may be monovalently or multivalently (i.e., if A were to be cyclic) linked to W. If A is divalent, for example, both valent sites preferably are linked to W directly.

When preferred embodiments of inorganic particles comprise silica, the attachably reactive moiety A is preferably a silane functional moiety. As used herein, the term "silane functional moiety" refers to a hydrolyzable moiety comprising at least one Si atom bonded to at least one oxygen atom in which the oxygen atom preferably is a constituent of an acyloxy group and/or an alkoxy group. Thus, representative examples of preferred silane functional moieties may be represented by the following formulae:

Generally, any of $R^1$, $R^2$, and $R^3$ of these silane functional moieties independently may be any nonionic, monovalent substituent (or divalent substituent when $R^1$ and $R^2$ collectively form a cyclic substituent as in Formula (2)) other than hydrogen. Additionally, any of $R^1$, $R^2$, and $R^3$ may be linear, branched, or cyclic. Thus, representative examples of moieties suitable for use as any of $R^1$, $R^2$, $R^3$, include any alkyl, aryl, alkaryl, acyl, alkenyl, arylene moieties, combinations thereof, or the like. Any of such moieties, if cyclic, may include a plurality of rings if desired. For example, aryl moieties may be aryl-aryl structures. In preferred embodiments, each of $R^1$, $R^2$, and $R^3$ is independently an alkyl group of 1 to 4 carbon atoms or an acyl group such as acetyl ($CH_3C(=O)-$) or substituted or unsubstituted benzoyl ($C_6H_5C(=O)-$). Most preferably, each of $R^1$, $R^2$, and $R^3$ independently is a lower alkyl group of 1 to 4 carbon atoms, more preferably $CH_3$.

Representative embodiments of surface treatment agents suitable for the marginally compatible or other embodiments include organosilanes such as, for example, isooctyl trimethoxysilane, N-(3-triethoxysilylpropyl)methoxyethoxyethoxyethyl carbamate (PEG3TMS), N-(3-triethoxysilylpropyl)methoxyethoxyethoxyethyl carbamate (PEG2TMS), 3-(methacryloyloxy)propyltrimethoxysilane, 3-acryloxypropyltrimethoxysilane, 3-(methacryloyloxy)propyltriethoxysilane, 3-(methacryloyloxy)propylmethyldimethoxysilane, 3-(acryloyloxypropyl)methyldimethoxysilane, 3-(methacryloyloxy)propyldimethylethoxysilane, 3-(methacryloyloxy)propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris(isobutoxysilane), vinyltriisopropenoxysilane, vinyltris(2-methoxyethoxysilane), and mixtures thereof. Pairs of relatively polar and nonpolar surface treatment agents may be selected from these and similar materials.

Preferred substrate particles that are surface modified in accordance with the present invention comprise nanometer-sized, inorganic oxide particles such as silica; metal oxides such as alumina, tin oxide, iron oxide, zirconia, vanadia, and titania; combinations of these; and the like. Silica is the most preferred substrate particle. The term "nanometer-sized" refers to particles that are characterized by an average particle diameter in the range of from about 5 nm to about 500 nm, more preferably about 5 nm to about 200 nm, even more preferably 5 nm to 100 nm. These size ranges facilitate ease of dispersion of the particles into the fluid vehicle, which preferably comprises a radiation curable binder precursor. Exemplary nanocomposites include nanoparticles that exhibit an average particle size in a range of about 5 to 50 nm, more particularly in a range of about 10 to 30 nm. Average particle size of the colloids can be measured using transmission electron microscopy to count the number of particles of a given diameter. In the practice of the present invention, particle size may be determined using any suitable technique. Preferably, particle size refers to the number average particle size and is measured using an instrument that uses transmission electron microscopy or scanning electron microscopy. Another method to measure particle size is dynamic light scattering which measures weight average particle size. One example of such an instrument found to be suitable is the N4 PLUS SUB-MICRON PARTICLE ANALYZER available from Beckman Coulter Inc. of Fullerton, Calif.

Nanocomposites can include surface-modified inorganic nanoparticles. Surface modification of inorganic particles can be carried out in water or in a mixture of water and one or more co-solvents depending on the particular surface treatment agent used. Surface modification can be conveniently performed at or below about 45 weight percent inorganic particles, preferably 15 to 25 weight percent inorganic particles. The starting colloidal dispersion can be diluted with water and/or co-solvent such as an alcohol or the like to obtain the desired inorganic particle content. Alcohols such as ethanol, isopropyl alcohol, methoxy-2-propanol, and the like are preferred as the co-solvent. The co-solvent may be used in a wide range of amounts in order to help solubilize components of the composition and to assist with water removal. For example, using about 1 to 2 parts by weight of co-solvent per 1 part by weight of the starting colloidal dispersion of inorganic particles would be suitable.

The weight ratio of surface treatment agent to inorganic particles necessary to achieve good coverage, preferably substantially monolayer coverage, depends on factors such as the molecular weight of the surface treatment agent and the particle size and chemical composition of the colloids.

For example, 20 nm silica particle requires about 0.6 mMole silane per gram of silica, whereas 75 nm silica particles require about 0.16 mMole silane per gram of silica.

The surface treatment agents will reactively attach to the surfaces of the particles. The resultant surface treated particles will have surface components in relative amounts and character corresponding to the surface treatment agents that were used. The ingredients are allowed to stand for a time sufficient to allow this reaction to occur. From 1 to about 48 hours, preferably about 20 hours would be suitable. The ingredients may be heated and maintained at an elevated temperature, e.g., at a temperature from about 35° C. to about 95° C., during this time to facilitate the reaction.

The resultant colloidal dispersion of surface modified particles, the desired fluid vehicle, and other optional ingredients of the composition may then be combined and mixed thoroughly to obtain a homogeneous dispersion. Enough fluid vehicle is used such that the combination has about 5 to 50, preferably 15 to 40 weight percent of particles (exclusive of the surface treatment agents) per 100 parts by weight of the binder precursor. The other additives are used in amounts in accordance with conventional practices. Solvent(s) is/are then removed, if necessary, until the composition has the desired amount of solvent. For radiation curable compositions, preferably the solvent is removed such that the composition is at least substantially solvent-free. Solvent may be removed using any suitable technique.

If not already surface treated in the manner desired, the substrate particles preferably are provided as a sol rather than as a powder or a gel. Preferred sols generally contain from about 15 to about 50 weight percent of colloidal inorganic oxide particles dispersed in a fluid medium. Representative examples of suitable fluid media for the colloidal particles include water, aqueous alcohol solutions, lower aliphatic alcohols, ethylene glycol, N,N-dimethylacetamide, formamide, and combinations thereof. The preferred fluid medium is aqueous, e.g., water and optionally one or more alcohols. When the colloidal particles are dispersed in an aqueous solvent, the particles are stabilized on account of common electrical charges that develop on the surface of each particle. The common electrical charges tend to promote dispersion rather than agglomeration or aggregation, because the similarly charged particles repel one another. By contrast, fumed silica and silica gels are aggregates of fused particles and thus will not as easily provide a uniform dispersion of particles when combined with the binder precursor. Such aggregates also are too big to be conveniently ink jetted.

Sols useful in the practice of the present invention may be prepared by methods well known in the art. Suitable sols also are commercially available. For example, colloidal silicas in aqueous solutions are commercially available under such trade designations as "LUDOX" (E.I. DuPont de Nemours and Co., Inc. Wilmington, Del.), "NYACOL" (Nyacol Co., Ashland, Mass.), and "NALCO" (Nalco Chemical Co., Oak Brook, Ill.). Most of these commercially available sols tend to be basic, being stabilized by alkali such as sodium hydroxide, potassium hydroxide, or ammonium hydroxide. Additional examples of suitable colloidal silicas are described in U.S. Pat. No. 5,126,394.

The sols used in the present invention generally may include countercations, in order to counter the surface charge of the colloids. Depending upon pH and the kind of colloids being used, the surface charges on the colloids can be negative or positive. Thus, either cations or anions are used as counter ions. Examples of cations suitable for use as counter ions for negatively charged colloids include $Na^+$, $K^+$, $Li^+$, a quaternary ammonium cation such as $NR_4^+$, wherein each R may be any monovalent moiety, but is preferably H or lower alkyl such as $CH_3$, combinations of these, and the like. Examples of counter anions suitable for use as counter ions for positively charged colloids include nitrate, acetate, chloride, etc.

The energy curable fluid vehicle, or binder precursor, of the present invention generally incorporates, in whole or in part, one or more energy curable constituents that can polymerize and/or crosslink when exposed to a suitable source of curing energy. Although one or more individual constituents of the vehicle may be a non-fluid material at room temperature, the one or more constituents combine to form a flowable fluid at least in combination with each other. Subject to other desired performance standards, any energy curable material or combinations thereof may be incorporated into the composition as a reactive, fluid vehicle. Such constituents may include one or more monomers, oligomers, and/or polymers. For ink jet printing applications, such materials, at least in combination, preferably exist as a fluid of ink jettable viscosity at the desired ink jet printhead temperature and shear conditions.

As used herein, the term "monomer" means a relatively low molecular weight material (i.e., having a molecular weight less than about 500 g/mole) having one or more energy polymerizable groups. "Oligomer" means a relatively intermediate molecular weight material having a molecular weight of from about 500 up to about 10,000 g/mole. "Polymer" means a relatively high molecular weight material having a molecular weight of at least about 10,000 g/mole, preferably at 10,000 to 100,000 g/mole. The term "molecular weight" as used throughout this specification means number average molecular weight unless expressly noted otherwise.

In the practice of the present invention, "energy curable" refers to functionality directly or indirectly pendant from a surface-treated particle, monomer, oligomer, polymer, or other constituent (as the case may be) that participate in polymerization and/or crosslinking reactions upon exposure to a suitable source of curing energy. Such functionality generally includes not only groups that cure via a cationic mechanism upon energy exposure but also groups that cure via a free radical mechanism. Representative examples of energy curable groups suitable in the practice of the present invention include epoxy groups, (meth)acrylate groups, olefinic carbon-carbon double bonds, allyloxy groups, alpha-methyl styrene groups, (meth)acrylamide groups, cyanate ester groups, vinyl ethers groups, combinations of these, and the like. Free radically polymerizable groups are preferred. Of these, (meth)acryl moieties are most preferred. The term "(meth)acryl", as used herein, encompasses acryl and/or methacryl.

The energy source used for achieving polymerization and/or crosslinking of the curable functionality may be actinic (e.g., radiation having a wavelength in the ultraviolet or visible region of the spectrum), accelerated particles (e.g., electron beam radiation), thermal (e.g., heat or infrared radiation), or the like. Preferably, the energy is actinic radiation or accelerated particles, because such energy provides excellent control over the initiation and rate of polymerization and/or crosslinking. Additionally, actinic radiation and accelerated particles can be used for curing at relatively low temperatures. This avoids degrading or evaporating components that might be sensitive to the relatively high temperatures that might be required to initiate polymerization and/or crosslinking of the energy curable groups when using thermal curing techniques. Suitable sources of curing energy include lasers, electron beams, mercury lamps, xenon lamps, carbon arc lamps, tungsten filament lamps, sunlight, low intensity ultraviolet light (black light), and the like. The use of black light for polymerization tends to form higher molecular weight polymers as compared to many other kinds of curing energy. Accordingly, when it is desired to form higher molecular weight materials upon curing, the use of black light is preferred.

The energy curable monomers generally may be mono-, di-, tri-, tetra- or otherwise multifunctional in terms of energy curable moieties. These monomers function as diluents or solvents for the higher molecular weight constituent(s) (if any), as viscosity reducers, as binders when cured, and as crosslinking agents with respect to other energy curable materials. The amount of such monomers to be incorporated into the reactive fluid vehicle can vary within a wide range depending upon the intended use of the resultant composition. As general guidelines, the fluid vehicle of the present invention may contain from about 25 to about 100, preferably 40 to 98 weight percent of such monomers.

Representative examples of monofunctional, energy curable monomers suitable for use in the reactive fluid vehicle include styrene, alpha-methylstyrene, substituted styrene, vinyl esters, vinyl ethers, N-vinyl-2-pyrrolidone, (meth)acrylamide, N-substituted (meth)acrylamide, octyl (meth)acrylate, iso-octyl (meth)acrylate, nonylphenol ethoxylate (meth)acrylate, isononyl (meth)acrylate, diethylene glycol (meth)acrylate, isobornyl (meth)acrylate, 2-(2-ethoxyethoxy)ethyl (meth)acrylate, 2-ethylhexyl (meth)acrylate, lauryl (meth)acrylate, butanediol mono(meth)acrylate, beta-carboxyethyl (meth)acrylate, isobutyl (meth)acrylate, cycloaliphatic epoxide, alpha-epoxide, 2-hydroxyethyl (meth)acrylate, (meth)acrylonitrile, maleic anhydride, itaconic acid, isodecyl (meth)acrylate, dodecyl (meth)acrylate, n-butyl (meth)acrylate, methyl (meth)acrylate, hexyl (meth)acrylate, (meth)acrylic acid, N-vinylcaprolactam, stearyl (meth)acrylate, hydroxy functional polycaprolactone ester (meth)acrylate, hydroxyethyl (meth)acrylate, hydroxymethyl (meth)acrylate, hydroxypropyl (meth)acrylate, hydroxyisopropyl (meth)acrylate, hydroxybutyl (meth)acrylate, hydroxyisobutyl (meth)acrylate, tetrahydrofurfuryl (meth)acrylate, combinations of these, and the like.

Multifunctional energy curable materials may also be incorporated into the reactive diluent to enhance one or more properties of the cured film, including crosslink density, hardness, tackiness, mar resistance, or the like. Examples of such higher functional, energy curable monomers include ethylene glycol di(meth)acrylate, hexanediol di(meth)acrylate, triethylene glycol di(meth)acrylate, tetraethylene glycol di(meth)acrylate, trimethylolpropane tri(meth)acrylate, ethoxylated trimethylolpropane tri(meth)acrylate, glycerol tri(meth)acrylate, pentaerythritol tri(meth)acrylate, pentaerythritol tetra(meth)acrylate, and neopentyl glycol di(meth)acrylate, combinations of these, and the like.

Other kinds of monomer selections can also be made to satisfy one or more other performance criteria. For example, in order to promote hardness and abrasion resistance of resultant cured material, fluid compositions of the present invention advantageously may incorporate radiation curable monomer(s) (hereinafter "high Tg component") whose presence causes the cured material, or a portion thereof, to have a higher glass transition temperature, Tg, as compared to an otherwise identical material lacking such high Tg component. Preferred monomeric constituents of the high Tg component generally include monomers whose homopolymers have a Tg of at least about 50° C., preferably at least about 60° C., and more preferably at least about 75° C. in the cured state. When used, the high Tg component may constitute 0.5 to 100 weight percent of the radiation curable, reactive diluent.

An exemplary class of radiation curable monomers that tend to have relatively high Tg characteristics suitable for incorporation into the high Tg component generally comprise at least one radiation curable (meth)acrylate moiety and at least one nonaromatic, alicyclic and/or nonaromatic heterocyclic moiety. Isobornyl (meth)acrylate is a specific example of one such monomer. A cured, homopolymer film formed from isobornyl acrylate, for instance, has a Tg of 88° C. The monomer itself has a molecular weight of 208 g/mole, exists as a clear fluid at room temperature, has a viscosity of 9 mPa·s at 25° C., has a surface tension of 31.7 dynes/cm at 25° C., and is an excellent reactive diluent for many kinds of oligomers and/or polymers. In the practice of the present invention, Tg of a monomer refers to the glass transition temperature of a cured film of a homopolymer of the monomer, in which Tg is measured by differential scanning calorimetry (DSC) techniques. 1,6-Hexanediol di(meth)acrylate is another example of a monomer with high Tg characteristics.

In order to promote adhesion both before and especially after radiation curing, fluid compositions of the present invention advantageously may incorporate radiation curable monomer(s) (hereinafter "adhesion promoting component") whose presence causes the uncured and/or cured material to have higher adhesion to the desired receiving substrate as compared to an otherwise identical formulation lacking such adhesion promoting component. When the substrate is a clear conductive material such as those used in touch panels, monomers can be selected to give good adhesion to those materials.

EXAMPLES

Tables I and II lists designations, generic names and descriptions, and the commercial manufacturer of various materials and instruments used in the preparation and/or evaluation of the following Examples. Unless otherwise indicated, all percentage amounts of materials are in weight percent.

TABLE I

Materials

| Designation | Generic Name/Description | Manufacturer (location) |
| --- | --- | --- |
| Nalco 2327 | colloidal silica (41.5% $SiO_2$) | Nalco Chemical (Naperville, IL) |
|  | 1-Methoxy-2-propanol | Aldrich (Milwaukee, WI) |
| PEG2TES | N-(3-triethoxysilylpropyl) methoxyethoxyethyl carbamate | (made as described below) |
|  | 1,6 hexanediol diacrylate (HDDA) | Sartomer Company (Exton, PA) |

TABLE I-continued

Materials

| Designation | Generic Name/Description | Manufacturer (location) |
|---|---|---|
| Firstcure BD3 | photoinitiator | Chemfirst Fine Chemicals (Pascagoula, MS) |
| CN371 | amine synergist | Sartomer Company (Exton, PA) |
| Irgacure 651 | benzil dimethyl ketal | Ciba Specialty Chemicals (Tarrytown, NY) |
| SR335 | lauryl acrylate (LA) | Sartomer Company (Exton, PA) |
| CD9052 | adhesion promoter | Sartomer Company (Exton, PA) |
| beta-CEA | beta-carboxyethyl acrylate | Rhone-Poulenc Surfactants and Specialties (Cranbury, NJ) |
| BS 1316 | isooctyltrimethoxysilane | Wacker Silicones Corporation |
| SR256 | 2-ethoxyethoxyethyl acrylate (EEEA) | Sartomer Company (Exton, PA) |
| SR306 | tripropylene glycol diacrylate (TPGDA) | Sartomer Company (Exton, PA) |

TABLE II

Instruments

| Designation | Generic Name/Description | Manufacturer (location) |
|---|---|---|
|  | 30 pL piezo printhead | Xaar, Ltd. (Cambridge, UK) |
|  | ITO coated glass | Glaverbel (Brussels, Belgium) |
| Wyko NT 2000 | optical profilometer microscope used to measure heights of dots | Veeco Instruments Inc. (Tucson, AZ) |
| EFOS | high pressure mercury UV lamp | EFOS (Mississauga, Ontario) |
| Fusion | medium pressure mercury UV lamp | Fusion UV Systems Inc. (Gaithersburg, MD) |
| GC | gas chromatograph (model 5890) | Hewlett Packard |
| TGA | thermal gravimetric analyzer (model TA 2940) | TA Instruments (New Castle, DE) |

PEG2TES refers to N-(3-triethoxysilylpropyl)methoxyethoxyethyl carbamate. It was prepared as follows. A 250 ml round-bottomed flask equipped with a magnetic stir bar was charged with diethylene glycol methyl ether (35 g) and methyl ethyl ketone (77 g). A majority of the solvent was removed via rotary evaporation to remove water. 3-(Triethoxysilyl)propylisocyanate (68.60 g) was then charged to the flask. Dibutyltin dilaurate (~3 mg) was added and the mixture stirred. The reaction proceeded with a mild exotherm. The reaction was run for approximately 16 hours at which time infrared spectroscopy showed no isocyanate. The remainder of the solvent and alcohol were removed via rotary evaporation at 90° C. to yield 104.46 g of PEG2TES as a somewhat viscous fluid.

Example 1

30% $SiO_2$, 2% Firstcure BD3, 2% Sartomer CN371, 66% HDDA

Nalco 2327 (399.3 g) was charged to a 1 quart jar. 1-Methoxy-2-propanol (446.7 g), PEG2TES (9.30 g) and A174 (18.90 g) were mixed together and added to the colloidal dispersion while stirring. The jar was sealed and heated to 80° C. for 16 hours. This resulted in a clear, blue dispersion of modified silica.

A 1 liter round-bottom flask (large neck) was charged with the above modified sol (400.0 g) and 1,6 hexanediol diacrylate (114.0 g). Water and alcohol were removed via rotary evaporation. A clear gel was obtained. The gel contained 38.85 wt % $SiO_2$ as measured by TGA. GC confirmed that no alcohol remained in the sample.

A curable, jettable formulation was prepared by combining 2 parts Firstcure BD-3, 2 parts Sartomer CN-371, 18.7 parts Hexanediol Diacrylate, and 77.3 parts of the gel described above, and placing the mixture in a 70° C. oven for 30 minutes. The mixture was then stirred until homogeneous.

The material was jetted on an experimental x-y printer set-up, using an MIT XaarJet 30 pL printhead. The printhead was heated to 50° C. using two, 10-ohm resistors in series, with the temperature controlled by a variable autotransformer. The jetting voltage was set to 35V. A pattern of single dots spaced 140 mils (about 3.5 mm) apart were jetted onto an ITO-coated polyester substrate. The materials were cured in air approximately 1 second after being jetted, using an EFOS Ultracure 100SS Plus High Pressure mercury 100 W UV lamp with a 250-450 nm filter. The table passed under the lamp at a rate of about 1 inch/second (about 2.5 cm/second), with the lamp approximately 0.25 inches (about 6 mm) above the film. Following the in-line cure, the samples were cured in air off-line using a variable power supply Fusion UV Systems Inc. processor with medium pressure mercury bulb, at 100% of input power (500-600 W/in), at 50 feet/minute (about 25 cm/sec.).

Example 2

20% $SiO_2$, 2% Irgacure 651, 78% HDDA

Nalco 2327 (200.0 g) was charged to a 1 L flask. 1-Methoxy-2-propanol (225.0 g) and PEG2TES (4.719 g) were mixed together and added to the stirring colloidal dispersion. The flask was heated to 85° C. for 4.5 hours while stirring. A174 (9.549 g) was added to the flask and the reaction was left stirring at 85° C. for an additional 17 hours. This resulted in a clear, blue dispersion of modified silica.

A 1 liter round-bottom flask (large neck) was charged with the above modified sol (200.0 g) and 1,6 hexanediol diacrylate (57.0 g). Water and alcohol were removed via rotary evaporation. A clear gel was obtained. The gel contained 38.48 wt % SiO$_2$ as measured by TGA. GC confirmed that no alcohol remained in the sample.

A curable, jettable formulation was prepared by combining 2 parts Irgacure 651, 45.9 parts Hexanediol Diacrylate, and 52.1 parts of the gel described above and placing the mixture in a 70° C. oven for 30 minutes. The mixture was then stirred until homogeneous.

The material was jetted on an experimental x-y printer set-up, using an MIT XaarJet 30 pL printhead. The printhead was heated to 50° C. using two, 10-ohm resistors in series, with the temperature controlled by a variable autotransformer. The jetting voltage was set to 35V. A pattern of single dots spaced 140 mils (about 3.5 mm) apart were jetted onto an ITO-coated polyester substrate. The materials were cured in air approximately 1 second after being jetted, using an EFOS Ultracure 100SS Plus High Pressure mercury 100 W UV lamp with a 250-450 nm filter. The table passed under the lamp at a rate of about 1 inch/second (about 2.5 cm/second), with the lamp approximately 0.25 inches (about 6 mm) above the film. Following the in-line cure, the samples were cured in air off-line using a variable power supply Fusion UV Systems Inc. processor with medium pressure mercury bulb, at 100% of input power (500-600 W/in), at 50 feet/minute (about 25 cm/sec.).

Example 3

25% SiO$_2$, 2% Firstcure BD3, 2% Sartomer CN371, 71% HDDA

Nalco 2327 (200.0 g) was charged to a 1 L flask. 1-Methoxy-2-propanol (225.0 g) and PEG2TES (4.719 g) were mixed together and added to the stirring colloidal dispersion. The flask was heated to 85° C. for 4.5 hours while stirring. A174 (9.549 g) was added to the flask and the reaction was left stirring at 85° C. for an additional 17 hours. This resulted in a clear, blue dispersion of modified silica.

A 1 liter round-bottom flask (large neck) was charged with the above modified sol (200.0 g) and 1,6 hexanediol diacrylate (57.0 g). Water and alcohol were removed via rotary evaporation. A clear gel was obtained. The gel contained 38.48 wt % SiO$_2$ as measured by TGA. GC confirmed that no alcohol remained in the sample.

A curable, jettable formulation was prepared by combining 1.8 parts Firstcure BD-3, 1.8 parts Sartomer CN-371, 26.5 parts Hexanediol Diacrylate, and 69.9 parts of the gel described above and placing the mixture in a 70° C. oven for 30 minutes. The mixture was then stirred until homogeneous.

The material was jetted on an experimental x-y printer set-up, using an MIT XaarJet 30 pL printhead. The printhead was heated to 50° C. using two, 10-ohm resistors in series, with the temperature controlled by a variable autotransformer. The jetting voltage was set to 35V. A pattern of single dots spaced 140 mils (about 3.5 mm) apart were jetted onto an ITO-coated polyester substrate. The materials were cured in air approximately 1 second after being jetted, using an EFOS Ultracure 100SS Plus High Pressure mercury 100 W UV lamp with a 250-450 nm filter. The table passed under the lamp at a rate of about 1 inch/second (about 2.5 cm/second), with the lamp approximately 0.25 inches (about 6 mm) above the film. Following the in-line cure, the samples were cured in air off-line using a variable power supply Fusion UV Systems Inc. processor with medium pressure mercury bulb, at 100% of input power (500-600 W/in), at 50 feet/minute (about 25 cm/sec.).

Example 4

25% SiO$_2$, 5% LA, 5% Sartomer CD9052, 1.9% Irgacure 651, 63.1% HDDA

Nalco 2327 (200.0 g) was charged to a 1L flask. 1-Methoxy-2-propanol (225.0 g) and PEG2TES (4.719 g) were mixed together and added to the stirring colloidal dispersion. The flask was heated to 85° C. for 4.5 hours while stirring. A174 (9.549 g) was added to the flask and the reaction was left stirring at 85° C. for an additional 17 hours. This resulted in a clear, blue dispersion of modified silica.

A 1 liter round-bottom flask (large neck) was charged with the above modified sol (200.0 g) and 1,6 hexanediol diacrylate (57.0 g). Water and alcohol were removed via rotary evaporation. A clear gel was obtained. The gel contained 38.48 wt % SiO$_2$ as measured by TGA. GC confirmed that no alcohol remained in the sample.

A curable, jettable formulation was prepared by combining 2.2 parts Irgacure 651, 4.7 parts Sartomer CD-9052, 4.7 parts Lauryl Acrylate, 26.6 parts Hexanediol Diacrylate, and 61.7 parts of the gel described above and placing the mixture in a 70° C. oven for 30 minutes. The mixture was then stirred until homogeneous.

The material was jetted on an experimental x-y printer set-up, using an MIT XaarJet 30 pL printhead. The printhead was heated to 50° C. using two, 10-ohm resistors in series, with the temperature controlled by a variable autotransformer. The jetting voltage was set to 35V. A pattern of single dots spaced 140 mils (about 3.5 mm) apart were jetted onto an ITO-coated polyester substrate. The materials were cured in air approximately 1 second after being jetted, using an EFOS Ultracure 100SS Plus High Pressure mercury 100 W UV lamp with a 250-450 nm filter. The table passed under the lamp at a rate of about 1 inch/second (about 2.5 cm/second), with the lamp approximately 0.25 inches (about 6 mm) above the film. Following the in-line cure, the samples were cured in air off-line using a variable power supply Fusion UV Systems Inc. processor with medium pressure mercury bulb, at 100% of input power (500-600 W/in), at 50 feet/minute (about 25 cm/sec.).

Example 5

30% SiO$_2$, 2% Firstcure BD3, 2% Sartomer CN371, 66% HDDA

Nalco 2327 (400.0 g) was charged to a 1 quart jar. 1-Methoxy-2-propanol (448.0 g), PEG2TES (9.60 g) and A174(18.48 g) were mixed together and added to the colloidal dispersion while stirring. The jar was sealed and heated to 80° C. for 16 hr. This resulted in a clear, blue dispersion of modified silica.

A 2 liter round-bottom flask (large neck) was charged with the above modified sol (870.6 g) and 1,6 hexanediol Diacrylate (248.1 g). Water and alcohol were removed via rotary evaporation. A clear gel was obtained. The gel contained 38.48 wt % SiO$_2$ as measured by TGA. GC confirmed that no alcohol remained in the sample.

A curable, jettable formulation was prepared by combining 2.1 parts Firstcure BD-3, 2.1 parts Sartomer CN-371, 18 parts Hexanediol Diacrylate, and 77.8 parts of the gel described above and placing the mixture in a 70° C. oven for 30 minutes. The mixture was then stirred until homogeneous.

The material was jetted on an experimental x-y printer set-up, using an MIT XaarJet 30 pL printhead. The printhead was heated to 50° C. using two, 10-ohm resistors in series, with the temperature controlled by a variable autotransformer. The jetting voltage was set to 35V. A pattern of single dots spaced 140 mils (about 3.5 mm) apart were jetted onto each of the following: ITO-coated polyester, ITO-coated polyester with a monolayer of Beta Carboxy Ethyl Acrylate, and ITO-coated polyester with a monolayer of Methacryloxypropyltimethoxysilane (A174). One sample was cured in air approximately 1 second after being jetted, using an EFOS Ultracure 100SS Plus High Pressure mercury 100 W UV lamp with a 250-450 nm filter. The table passed under the lamp at a rate of about 1 inch/second (about 2.5 cm/second), with the lamp approximately 0.25 inches (about 6 mm) above the film. Following the in-line cure, the samples were cured in air off-line using a variable power supply Fusion UV Systems, Inc. processor with medium pressure mercury bulb, at 100% of input power (500-600 W/in), at 50 feet/minute (about 25 cm/sec.). One sample was just cured off-line, using the same conditions as given above.

Example 6

15% $SiO_2$, 2% Firstcure BD3, 2% Sartomer CN371, 8.1% Beta-CEA, 72.9% HDDA

Nalco 2327 (399.9 g) was charged to a 1 quart jar. 1-Methoxy-2-propanol (280.1 g), isooctyl silane (9.90 g) and A174 (15.40 g) were mixed together and added to the colloidal dispersion while stirring. The jar was sealed and heated to 80° C. for 16 hours. This resulted in a white dispersion of modified silica.

A 2 liter round-bottom flask (large neck) was charged with the above modified sol (400.0 g), heptane (150.0 g) and 1,6 hexanediol diacrylate (188.0 g). Water and alcohol were removed via rotary evaporation. A clear gel was obtained. The gel contained 32.45 wt % $SiO_2$ as measured by TGA. GC confirmed that no alcohol remained in the sample.

A curable, jettable formulation was prepared by combining 2.0 parts Firstcure BD-3, 2.0 parts Sartomer CN-371, 8.2 parts Beta-Carboxyethyl Acrylate, 41.6 parts Hexanediol Diacrylate, and 46.2 parts of the gel described above and placing the mixture in a 70° C. oven for 30 minutes. The mixture was then stirred until homogeneous.

The material was jetted on an experimental x-y printer set-up, using an MIT XaarJet 30 pL printhead. The printhead was heated to 50° C. using two, 10-ohm resistors in series, with the temperature controlled by a variable autotransformer. The jetting voltage was set to 35V. A pattern of single dots spaced 140 mils (about 3.5 mm) apart were jetted onto each of the following: ITO-coated polyester, ITO-coated polyester with a monolayer of Beta Carboxy Ethyl Acrylate, and ITO-coated polyester with a monolayer of Methacryloxypropyltimethoxysilane (A174). One sample was cured in air approximately 1 second after being jetted, using an EFOS Ultracure 100SS Plus High Pressure mercury 100 W UV lamp with a 250-450 nm filter. The table passed under the lamp at a rate of about 1 inch/second (about 2.5 cm/second), with the lamp approximately 0.25 inches (about 6 mm) above the film. Following the in-line cure, the samples were cured in air off-line using a variable power supply Fusion UV Systems Inc. processor with medium pressure mercury bulb, at 100% of input power (500-600 W/in), at 50 feet/minute (about 25 cm/sec.). One sample was just cured off-line, using the same conditions as given above.

Example 7

30% $SiO_2$, 2% Firstcure BD3, 2% Sartomer CN371, 0.1% EEEA, 65.9% HDDA

Nalco 2327 (399.3 g) was charged to a 1 quart jar. 1-Methoxy-2-propanol (446.7 g), PEG2TES (9.30 g) and A174 (18.90 g) were mixed together and added to the colloidal dispersion while stirring. The jar was sealed and heated to 80° C. for 16 hours. This resulted in a clear, blue dispersion of modified silica.

A 1 liter round-bottom flask (large neck) was charged with the above modified sol (400.0 g) and 1,6 hexanediol diacrylate (114.0 g). Water and alcohol were removed via rotary evaporation. A clear gel was obtained. The gel contained 38.85 wt % $SiO_2$ as measured by TGA. GC confirmed that no alcohol remained in the sample.

A curable, jettable formulation was prepared by combining 2 parts Firstcure BD-3, 2 parts Sartomer CN-371, 0.4 parts 2(2-Ethoxyethoxy) Ethyl Acrylate, 18.6 parts Hexanediol Diacrylate, and 77 parts of the gel described above and placing the mixture in a 70° C. oven for 30 minutes. The mixture was then stirred until homogeneous.

The material was jetted on an experimental x-y printer set-up, using an MIT XaarJet 30 pL printhead. The printhead was heated to 50° C. using two, 10-ohm resistors in series, with the temperature controlled by a variable autotransformer. The jetting voltage was set to 35V. A pattern of single dots spaced 140 mils (about 3.5 mm) apart were jetted onto an ITO-coated polyester substrate. The materials were cured in air approximately 1 second after being jetted, using an EFOS Ultracure 100SS Plus High Pressure mercury 100 W UV lamp with a 250-450 nm filter. The table passed under the lamp at a rate of about 1 inch/second (about 2.5 cm/second), with the lamp approximately 0.25 inches (about 6 mm) above the film. Following the in-line cure, the samples were cured in air off-line using a variable power supply Fusion UV Systems Inc. processor with medium pressure mercury bulb, at 100% of input power (500-600 W/in), at 50 feet/minute (about 25 cm/sec.).

Example 8

25% $SiO_2$, 2% Firstcure BD3, 2% Sartomer CN371, 71% HDDA

Nalco 2327 (199.9 g) was charged to a 1L round bottom flask. Ethanol (220.0 g), PEG2TES (4.72 g) and A174 (9.49 g) were mixed together and added to the colloidal dispersion while stirring. The solution continued to stir while heating for 16 hours at 70° C. This resulted in a clear, blue dispersion of modified silica.

A 1 liter round-bottom flask (large neck) was charged with the above modified sol (250.0 g) and 1,6 hexanediol diacrylate (70.5 g). Water and alcohol were removed via rotary evaporation. A clear gel was obtained. The gel contained about 38 wt % $SiO_2$ as measured by TGA. GC confirmed that no alcohol remained in the sample.

A curable, jettable formulation was prepared by combining 2 parts Firstcure BD-3, 2 parts Sartomer CN-371, 30.3 parts Hexanediol Diacrylate, and 65.7 parts of the gel described above and placing the mixture in a 70° C. oven for 30 minutes. The mixture was then stirred until homogeneous.

The material was jetted on an experimental x-y printer set-up, using an MIT XaarJet 30 pL printhead. The printhead was heated to 50° C. using two, 10-ohm resistors in series, with the temperature controlled by a variable autotransformer. The jetting voltage was set to 35V. A pattern of single dots spaced 140 mils (about 3.5 mm) apart were jetted onto AGFA Orgacon conductive polymer films of 2700 ohms resistance and 300 ohms resistance. The materials were cured in air approximately 1 second after being jetted, using an EFOS Ultracure 100SS Plus High Pressure mercury 100 W UV lamp with a 250-450 nm filter. The table passed under the lamp at a rate of about 1 inch/second (about 2.5 cm/second), with the lamp approximately 0.25 inches (about 6 mm) above the film. Following the in-line cure, the samples were cured in air off-line using a variable power supply Fusion UV Systems Inc. processor with medium pressure mercury bulb, at 100% of input power (500-600 W/in), at 50 feet/minute (about 25 cm/sec.).

Example 9

2% Firstcure BD3, 2% Sartomer CN371, 96% HDDA

A curable, jettable formulation was prepared by combining 2 parts Firstcure BD-3, 2 parts Sartomer CN-371, and 96 parts Hexanediol Diacrylate, and placing the mixture in a 70° C. oven for 30 minutes. The mixture was then stirred until homogeneous.

The material was jetted on an experimental x-y printer set-up, using an MIT XaarJet 30 pL printhead. The printhead was heated to 50° C. using two, 10-ohm resistors in series, with the temperature controlled by a variable autotransformer. The jetting voltage was set to 35V. A pattern of single dots spaced 140 mils (about 3.5 mm) apart were jetted onto an ITO-coated polyester substrate. The materials were cured in air approximately 1 second after being jetted, using an EFOS Ultracure 100SS Plus High Pressure mercury 100 W UV lamp with a 250-450 nm filter. The table passed under the lamp at a rate of about 1 inch/second (about 2.5 cm/second), with the lamp approximately 0.25 inches (about 6 mm) above the film. Following the in-line cure, the samples were cured in air off-line using a variable power supply Fusion UV Systems Inc. processor with medium pressure mercury bulb, at 100% of input power (500-600 W/in), at 50 feet/minute (about 25 cm/sec.).

Example 10

2% Firstcure BD3, 2% Sartomer CN371, 96% TPGDA

A curable, jettable formulation was prepared by combining 2 parts Firstcure BD-3, 2 parts Sartomer CN-371, and 96 parts TriPropylene Glycol Diacrylate, and placing the mixture in a 70° C. oven for 30 minutes. The mixture was then stirred until homogeneous.

The material was jetted on an experimental x-y printer set-up, using an MIT XaarJet 30 pL printhead. The printhead was heated to 50° C. using two, 10-ohm resistors in series, with the temperature controlled by a variable autotransformer. The jetting voltage was set to 35V. A pattern of single dots spaced 140 mils (about 3.5 mm) apart were jetted onto an ITO-coated polyester substrate. The materials were cured in air approximately 1 second after being jetted, using an EFOS Ultracure 100SS Plus High Pressure mercury 100 W UV lamp with a 250-450 nm filter. The table passed under the lamp at a rate of about 1 inch/second (about 2.5 cm/second), with the lamp approximately 0.25 inches (about 6 mm) above the film. Following the in-line cure, the samples were cured in air off-line using a variable power supply Fusion UV Systems Inc. processor with medium pressure mercury bulb, at 100% of input power (500-600 W/in), at 50 feet/minute (about 25 cm/sec.).

Example 11

30% $SiO_2$, 2% Firstcure BD3, 2% Sartomer CN371, 66% HDDA

Nalco 2327 (399.3 g) was charged to a 1 quart jar. 1-Methoxy-2-propanol (446.7 g), PEG2TES (9.30 g) and A174 (18.90 g) were mixed together and added to the colloidal dispersion while stirring. The jar was sealed and heated to 80° C. for 16 hours. This resulted in a clear, blue dispersion of modified silica.

A 1 liter round-bottom flask (large neck) was charged with the above modified sol (400.0 g) and 1,6 hexanediol diacrylate (114.0 g). Water and alcohol were removed via rotary evaporation. A clear gel was obtained. The gel contained 38.85 wt % $SiO_2$ as measured by TGA. GC confirmed that no alcohol remained in the sample.

A curable, jettable formulation was prepared by combining 2 parts Firstcure BD-3, 2 parts Sartomer CN-371, 18.6 parts Hexanediol Diacrylate, and 77.4 parts of the gel described above, and placing the mixture in a 70° C. oven for 30 minutes. The mixture was then stirred until homogeneous.

The material was jetted on an experimental x-y printer set-up, using an MIT XaarJet 30 pL printhead. The printhead was heated to 50° C. using two, 10-ohm resistors in series, with the temperature controlled by a variable autotransformer. The jetting voltage was set to 35V. A pattern of single dots spaced 140 mils (about 3.5 mm) apart were jetted onto an ITO-coated polyester substrate. The materials were cured in air approximately 1 second after being jetted, using an EFOS Ultracure 100SS Plus High Pressure mercury 100 W UV lamp with a 250-450 nm filter. The table passed under the lamp at a rate of about 1 inch/second (about 2.5 cm/second), with the lamp approximately 0.25 inches (about 6 mm) above the film. This procedure was repeated four times, resulting in stacked dots, each corresponding to 5 droplets printed one on top of the other, each new droplet being printed after the previous droplet was cured in line. Following the printing and in-line curing of all the droplets, the stacked dots were cured in air off-line using a variable power supply Fusion UV Systems Inc. processor with medium pressure mercury bulb, at 100% of input power (500-600 W/in), at 50 feet/minute (about 25 cm/sec.).

Various properties were measured for dots made under each of the above Examples. Dot heights were measured for some of the Examples by optical profilometry using a Wyco NT 2000 microscope. Dot diameters were measured for some of the Examples using a microscope. Adhesion results were evaluated for each of the Examples by quantitatively and qualitatively observing whether the dots adhered to the printing surface. An adhesion result given as a percentage represents the observed percentage of dots that were adhered. An adhesion result indicated as poor means that a significant number of the dots did not adhere well to the surface, and therefore qualitative measurements were no taken. To perform abrasion testing, the dots were overlaid with a 7 mil thick (about 0.2 mm thick) PET film having a hardcoat on one side and an ITO coating on the other side. The ITO coating side was oriented toward the spacers so that the hardcoat provided a touch surface. A stylus was then cycled back and forth over a 2 inch (about 5 cm) distance on the touch surface for 100,000 cycles using a force of about 350 grams. The dots were then inspected to determine whether all dots remained attached or whether any dots detached. The results of the testing are tabulated in Table III. Blank cells in Table III indicate data that was not obtained.

TABLE III

Test Results

| Example No. | Height Range (microns) | Diameter Range (microns) | Adhesion Results | Abrasion Results |
|---|---|---|---|---|
| 1 | | | 100% | all dots remain attached |
| 2 | 11.3 to 14.1 | 66.4 to 84 | 96% | several dots detached |
| 3 | 10.7 to 14.3 | 65.2 to 90 | 100% | several dots detached |
| 4 | 8 to 11.1 | 61.6 to 97 | poor | |
| 5 | | | 100% | all dots remain attached |
| 6 | | | poor | |
| 7 | | 75 | 80% | several dots detached |
| 8 | | 75 | poor | |
| 9 | | 67.5 | poor | most or all dots detached |
| 10 | | 77.5 | poor | most or all dots detached |
| 11 | 23.2 to 27.8 | 102 to 138 | | |

It should be noted that the dots made in Examples 1-11 were relatively large, and in some cases oblong shaped, due to the fact that the ink jet printing head used was not optimized for printing materials at elevated temperatures. Uniform heating of the ink jet nozzle was difficult to attain.

All of the dots made in Examples 1-10 were also visually inspected for optical clarity of the substrate element. Each of the substrates made in the Examples had adequate optical clarity, and the ink jetted dots qualitatively appeared less visible than the screen printed, fumed silica-containing spacer dots on the substrates of commercially available touch screens.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

Each of the patents, patent documents, and publications cited above is hereby incorporated into this document as if reproduced in full.

What is claimed is:

1. A method for making a touch activated user input device comprising the steps of:
   providing a first substrate comprising a first conductive coating;
   ink jet printing a plurality of dots on the first conductive coating, each of the dots including nanoparticles;
   hardening the dots to form spacers adhered to the first substrate; and
   placing a second substrate comprising a second conductive coating over the first substrate such that the spacers maintain a distance between the first and second substrates to prevent detection of a touch location when no external force is applied and allow detection of a localized touch location when a sufficient localized external force is applied between the first and second substrates.

2. The method of claim 1, wherein the dots comprise a nanocomposite comprising surface-modified inorganic nanoparticles.

3. The method of claim 2, wherein the surface-modified inorganic nanoparticles include silica nanoparticles.

4. The method of claim 2, wherein the nanoparticles are present in an amount of about 5% or more by weight of the nanocomposite.

5. The method of claim 2, wherein the nanoparticles are present in an amount of about 10% to 40% by weight of the nanocomposite.

6. The method of claim 2, wherein the nanoparticles have an average diameter in a range of about 10 to 30 nm.

7. The method of claim 2, wherein the nanocomposite further comprises hexanediol diacrylate.

8. The method of claim 1, wherein the step of ink jet printing a plurality of dots comprises ink jet printing a heated gel composition.

9. The method of claim 8, wherein the gel composition comprises a nanocomposite gel.

10. The method of claim 9, wherein the nanocomposite gel composition comprises surface-modified silica nanoparticles dispersed in an energy curable fluid vehicle.

11. The method of claim 10, wherein the energy curable fluid vehicle comprises hexanediol diacrylate.

12. The method of claim 10, wherein the silica nanoparticles are present in an amount of about 5% or more by weight of the nanocomposite gel.

13. The method of claim 10, wherein the silica nanoparticles are present in an amount of about 10% to 40% by weight of the nanocomposite gel.

14. The method of claim 10, wherein the silica nanoparticles have an average diameter of about 10 to 30 nm.

15. The method of claim 1, wherein the first and second conductive coatings each comprise a transparent conductive coating.

16. The method of claim 1, wherein the spacer dots have heights of about 2 microns or more and have height to diameter aspect ratios of about 1:10 or more.

17. The method of claim 1, wherein the step of inkjet printing comprises ink jet printing a material onto a pre-existing dot.

18. The method of claim 1, further comprising associating the touch activated user input device with an electronic display.

19. A method for making a touch activated user input device comprising the steps of;
   providing a first substrate comprising a first conductive coating;
   ink jet printing a gel composition to define a plurality of dots on the first conductive coating;

hardening the dots to form spaces adhered to the first substrate; and placing a second substrate comprising a second conductive coating over the first substrate such that the spacers maintain a distance between the first and second substrates to prevent detection of a touch location when no external force is applied and allow detection of a localized touch location when a sufficient localized external force is applied between the first and second substrates.

20. The method of claim 19, wherein the gel composition comprises a nanocomposite gel including nanoparticles dispersed in an energy curable fluid vehicle.

21. The method of claim 20, wherein the nanoparticles comprises surface-modified silica nanoparticles.

22. The method of claim 20, wherein the nanoparticles have an average diameter in a range of about 10 to 30 nm.

23. The method of claim 19, wherein the gel composition comprises hexanediol diacrylate.

* * * * *